Patented July 11, 1933

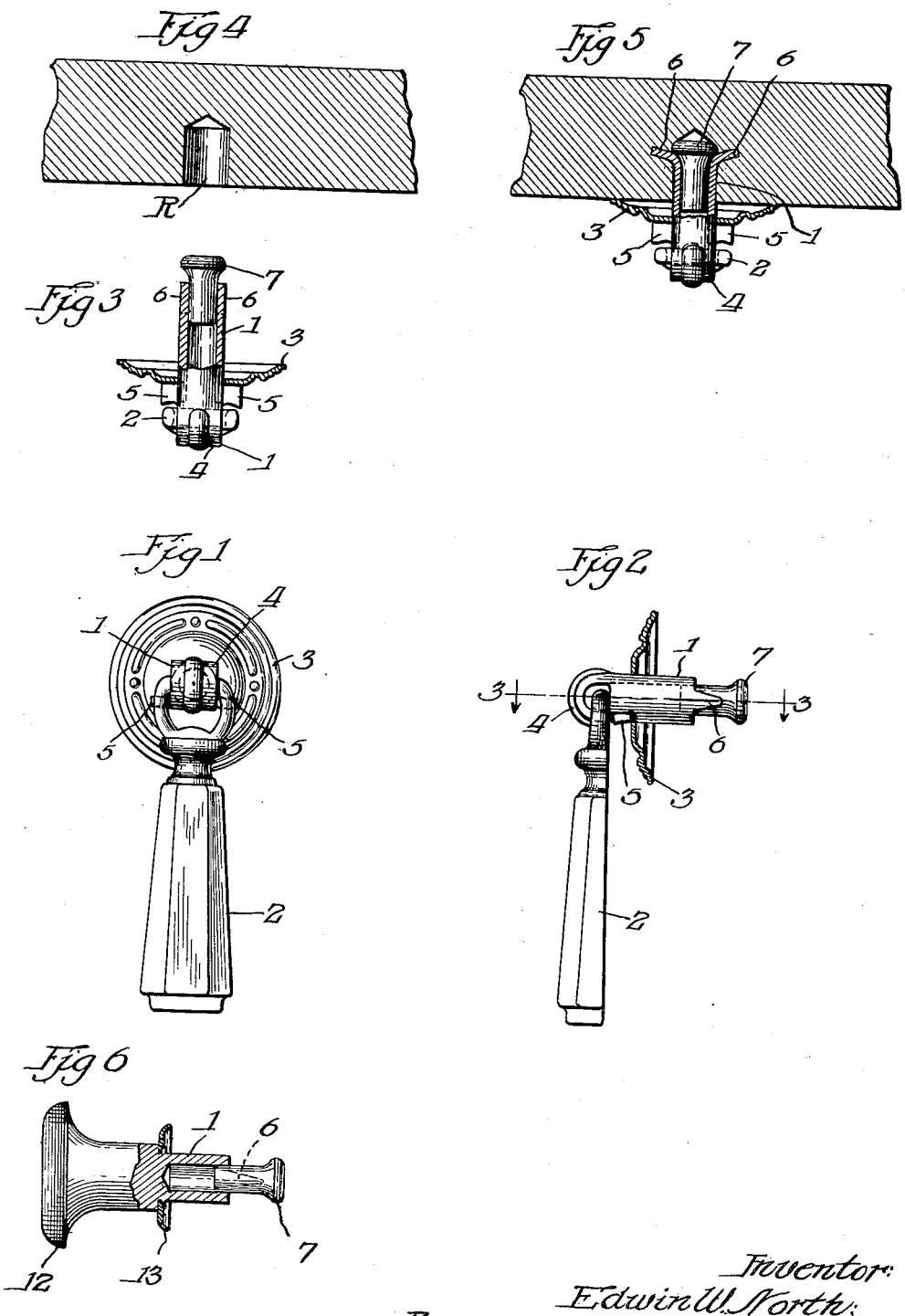

1,917,319

UNITED STATES PATENT OFFICE

EDWIN W. NORTH, OF ROCKFORD, ILLINOIS, ASSIGNOR TO NATIONAL LOCK CO., OF ROCKFORD, ILLINOIS, A CORPORATION OF DELAWARE

FURNITURE TRIMMING

Application filed March 22, 1930. Serial No. 437,989.

This invention relates to trimmings such as knobs and pendants to be applied to furniture and more particularly to such a fitting as will eliminate the necessity of screws or bolts for securing them to the furniture and which when used as a pendant fitting will not mar the furniture.

It has been the practice to screw trimmings of this nature to the fronts or other parts of furniture by the means of screws or bolts. When screws are used the fittings frequently become loose due to partial turning movements of the fittings and once loosened the holes become worn after which it is practically impossible to maintain the fittings in tight engagement with the furniture. When bolts or through screws are used the heads, or nuts, as the case may be, project from the inner side of the furniture and are of course unsatisfactory.

It is the purpose of this invention therefore to provide a trimming and form the post member thereof with anchorage means which eliminates the necessity of screws or bolts and yet which secures the fitting rigidly and permanently to the furniture.

According to this invention the fitting such as a knob, pendant or the like is provided with an expandible portion which is adapted to be seated in the furniture and expanded thereagainst. In the preferred form of this invention the fitting is provided with an integral tubular post constructed to prevent any pendants swivelled thereto from striking the furniture. The post is also constructed to be inserted in a recess in the furniture and which is engageable with an expanding anvil-like member. This anvil-like member serves to expand the inserted portion of the fitting against and into the side walls of the aperture in the furniture when the fitting is inserted in the aperture a predetermined distance.

A better understanding of this invention will be had from the detailed description given in connection with the drawing in which:

Fig. 1 is a front elevation of a pendant fitting constructed in accordance with this invention.

Fig. 2 is a side elevation partly in section of the trim shown in Fig. 1.

Fig. 3 is a fragmentary section on line 3—3 of Fig. 2.

Fig. 4 is a section through a portion of a piece of furniture showing the recess therein provided to receive the anchoring means of the trim.

Fig. 5 is a fragmentary section illustrating a trim constructed in accordance with this invention anchored to the furniture, and Fig. 6 is a fragmentary section of a different form of trim embodying the principles of this invention.

Referring more particularly to the drawing and to Figures 1 to 5 inclusive there is shown a trimming member for furniture comprising a post or stem 1 to which is pivotally attached a pendant or hand grip 2 and the usual escutcheon plate 3. The post or stem portion is tubular preferably being constructed of a single piece of sheet metal rolled to form a tubular stem one end of which terminates in a tongue bent reversely to form a swivel loop or eye 4 and formed with a pair of lugs or stops 5 projecting laterally from its outer end and which serve to limit the swinging movement of the pendant to prevent the same from coming in contact with the face of the furniture. The inner end of the tubular stem or post, which is adapted to be received in a recess R in the furniture, terminates in a pair of prongs or tangs 6 reduced in size to be readily expandible.

An expanding or anvil element 7 is provided having a cylindrical stem portion of the proper diameter to fit within the tubular end of the stem and also having an enlarged head connected to the cylindrical portion by inclined sides the sides and head serving to spread or expand the prongs 6 into the side walls of the recess R when the stem has been driven into the recess as is clearly shown in Fig. 5.

The recess in the furniture must be drilled to a proper depth to receive abutment member 7 and to permit the stem to be inserted in the recess the proper distance to clamp the escutcheon plate 3 tightly against the outer surface of the furniture when the trim is driven in the recess to expand the prongs 6.

In Fig. 6 there is shown a slightly modified form of fitting in which the outer end of the post 1 is in the form of a knob 12 rather than a pendant and is provided with an escutcheon disc 12. The anchorage means is the same as that described in connection with Figs. 1–5.

From the above description it follows that there is provided a trimming for furniture which may be rigidly and permanently secured to the furniture in such a manner as to preclude removal therefrom and by means which does not detract from the ornamentation of the trimming nor project through portions of the furniture. It is also apparent that in view of the fact that no screws or bolts are necessary the danger of splitting the furniture or having projections upon the interior of the furniture is eliminated. The trim can be attached to practically any thickness of furniture it merely being necessary to form the length of the stem and abutment member accordingly and drill a suitable recess.

The trimming may be attached without the use of any auxiliary or special tools a hammer being the only implement that is necessary. It is preferable of course to use a soft faced hammer which will not mar the finish of the trim. In some instances it may be desirable to use a special tool which will fit over the swivel end of the post to prevent the same from being deformed when being driven into the furniture.

It is obvious that many changes may be made in the details of construction without departing from the spirit and scope of the invention as defined in the claim appended hereto.

I claim:

A trimming member for furniture comprising a tubular stem terminating in a plurality of tangs and adapted to enter a recess in the furniture, said stem being of sufficient length to project outwardly therefrom and a cylindrical anvil adapted to be seated in the bottom of said recess and having an enlarged end portion constructed to engage the tangs of said stem and to direct said tangs into the wall of said recess upon forceful insertion of the stem into the recess and against the anvil, said tangs extending into the furniture and being interlocked therein and constituting the sole means of securing said stem to the furniture, the outer end of said stem having a finger grip portion connected thereto.

In witness of the foregoing I affix my signature.

EDWIN W. NORTH.